United States Patent
Wang (10) Patent No.: US 9,243,552 B2
(45) Date of Patent: Jan. 26, 2016

(54) METHOD FOR DETERMINING WASTEGATE VALVE LIFT

(71) Applicant: Ford Global Technologies, LLC, Dearborn, MI (US)

(72) Inventor: Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 13/914,386

(22) Filed: Jun. 10, 2013

(65) Prior Publication Data

US 2014/0360178 A1 Dec. 11, 2014

(51) Int. Cl.
*F02D 23/00* (2006.01)
*F02B 33/44* (2006.01)
*F02B 37/18* (2006.01)
*F02D 41/00* (2006.01)
*F02D 41/06* (2006.01)
*F02D 41/14* (2006.01)
*F02B 37/10* (2006.01)
*F02B 39/10* (2006.01)
*F02D 41/24* (2006.01)

(52) U.S. Cl.
CPC .............. *F02B 37/183* (2013.01); *F02B 37/18* (2013.01); *F02D 41/0007* (2013.01); *F02D 41/064* (2013.01); *F02D 41/1445* (2013.01); *F02B 37/10* (2013.01); *F02B 39/10* (2013.01); *F02D 41/2464* (2013.01); *F02D 2200/021* (2013.01); *F02D 2200/0406* (2013.01); *Y02T 10/144* (2013.01); *Y02T 10/40* (2013.01)

(58) Field of Classification Search
CPC .......... F02B 37/16; F02B 39/10; F02B 37/18; F02B 37/183; F02B 37/186; F02B 2307/162; F02B 33/446; F01N 13/008; F02C 6/12; F02D 41/0007; F02D 41/1439; F02D 41/1445; F02D 41/1446; F02M 25/0707; F02M 25/0713; F05B 2220/40
USPC .............. 60/607–608, 602, 605.1, 605.2, 611
See application file for complete search history.

(56) References Cited

U.S. PATENT DOCUMENTS

| | | | | |
|---|---|---|---|---|
| 4,286,433 | A | * | 9/1981 | Detweiler ........................ 60/602 |
| 4,378,677 | A | | 4/1983 | Zumstein |
| 4,459,809 | A | | 7/1984 | Tadokoro et al. |
| 4,656,834 | A | | 4/1987 | Elpern |
| 5,729,980 | A | | 3/1998 | Mackay |

(Continued)

FOREIGN PATENT DOCUMENTS

WO 2008025754 A1 3/2008

OTHER PUBLICATIONS

Kokotovic, Vladimir V. et al., "Method and System for Operating an Engine Turbocharger Waste Gate," U.S. Appl. No. 13/896,260, filed May 16, 2013, 31 pages.

(Continued)

*Primary Examiner* — Thai Ba Trieu
(74) *Attorney, Agent, or Firm* — Julia Voutyras; Alleman Hall McCoy Russell & Tuttle LLP (57) ABSTRACT

Systems and methods for determining the lift of a wastegate valve are provided. Methods comprise determining a relation between an actuator position and a lift of a wastegate valve at engine start-up in a temperature range. The relation may be modified based on a difference between a desired boost level and an actual boost level.

20 Claims, 4 Drawing Sheets

(56) References Cited

U.S. PATENT DOCUMENTS

| | | | |
|---|---|---|---|
| 5,816,047 A | 10/1998 | Zurlo | |
| 6,012,289 A * | 1/2000 | Deckard et al. | 60/602 |
| 6,484,673 B1 * | 11/2002 | Davis et al. | 123/26 |
| 6,681,567 B2 * | 1/2004 | Yasui et al. | 60/285 |
| 8,001,782 B2 | 8/2011 | Pursifull | |
| 8,109,089 B2 | 2/2012 | Gilch et al. | |
| 8,117,841 B2 | 2/2012 | Eckart | |
| 8,347,625 B2 | 1/2013 | Baeuerle | |
| 2009/0048802 A1 | 2/2009 | Wang et al. | |
| 2010/0154741 A1 * | 6/2010 | Arnett et al. | 123/349 |
| 2010/0167607 A1 * | 7/2010 | Ozaki et al. | 440/88 HE |
| 2011/0023481 A1 | 2/2011 | Baeuerle | |
| 2012/0171059 A1 | 7/2012 | Love et al. | |
| 2012/0222418 A1 * | 9/2012 | Watanabe | 60/602 |

OTHER PUBLICATIONS

Kokotovic, Vladimir V et al., "Electric Waste Gate Control System Sensor Calibration with End-Stop Detection," U.S. Appl. No. 13/896,257, filed May 16, 2013, 33 pages.

Karnik, Amey Y. et al., "Method for Controlling a Turbocharger Arrangement with an Electric Actuator and Spring," U.S. Appl. No. 13/654,309, filed Oct. 17, 2012, 32 pages.

* cited by examiner

METHOD FOR DETERMINING WASTEGATE VALVE LIFT

FIELD

The disclosure relates generally to a method for controlling a turbocharger arrangement of an internal combustion engine and particularly to controlling a wastegate valve.

BACKGROUND AND SUMMARY

Engines may use a turbocharger to improve engine torque/power output density. In one example, a turbocharger may include a compressor and a turbine connected by a drive shaft, where the turbine is coupled to an exhaust manifold side and the compressor is coupled to an intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, for example with a wastegate. The wastegate may include a wastegate valve which may be opened to divert gas away from the turbine based on operating conditions to achieve the desired boost. In one example, the wastegate may be electrically actuated by an associated electric actuator. The electric actuator is coupled to the wastegate valve via a mechanical linkage and driven via commanded actuator positions to control the wastegate valve position, thereby controlling the amount of gas reaching the turbine and achieving the desired boost.

U.S. Pat. No. 8,347,625 describes an electronic wastegate arrangement in which an electric actuator such as a rotary motor is coupled via a rod-like mechanical linkage to a wastegate valve. The electric actuator is positioned a distance away from the wastegate valve, opposite a side of the valve whereat diverted gas flows as the valve is opened.

The inventors herein have recognized several issues with such an approach. As temperatures proximate the wastegate valve are high, the electric actuator is positioned far enough away from the valve operate normally. Accordingly, a sensor indicating a position of the electric actuator is positioned proximate the actuator and away from the wastegate valve. Thus, the actual position (e.g., lift from a valve seat) of the wastegate valve cannot be determined. Material deformation in the linkage coupling the actuator to the wastegate valve due to high temperatures further complicates control of the valve, as a commanded actuator position will result in an inaccurate valve position, in turn causing an inaccurate level of boost to be supplied to an engine.

Systems and methods for determining the lift of a wastegate valve are provided. For example, a method comprises determining a relation between an actuator position and a lift of a wastegate valve at engine start-up in a temperature range. The relation may be modified based on a difference between a desired boost level and an actual boost level.

In this way, the lift of a wastegate valve may be determined such that commanded actuator positions result in the supply of a desired boost level even as material deformation (e.g., elongation) in the valve and mechanical linkage coupling the valve to the actuator occurs in the presence of high temperatures. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In boosted engines, an electronic wastegate actuator may provide precise output to achieve delivery of a desired boost to the engine. The actuator may be coupled to a wastegate valve via a mechanical linkage such as a rod to separate the actuator from high temperatures proximate the valve. As the actuator, and a sensor indicating its position, may be separated from the valve by a distance, the actual valve position (e.g., lift from a valve seat) is unavailable. Valve lift indeterminacy is further exacerbated as the wastegate arrangement encounters high temperatures; in such operating conditions the mechanical linkage coupling the actuator to the wastegate valve will undergo material deformation (e.g., elongation). Thus, an actuator position commanded by an engine controller may place the wastegate valve in a position inappropriate for a desired boost level, causing an incorrect boost level to be supplied to an engine.

Figure 1:
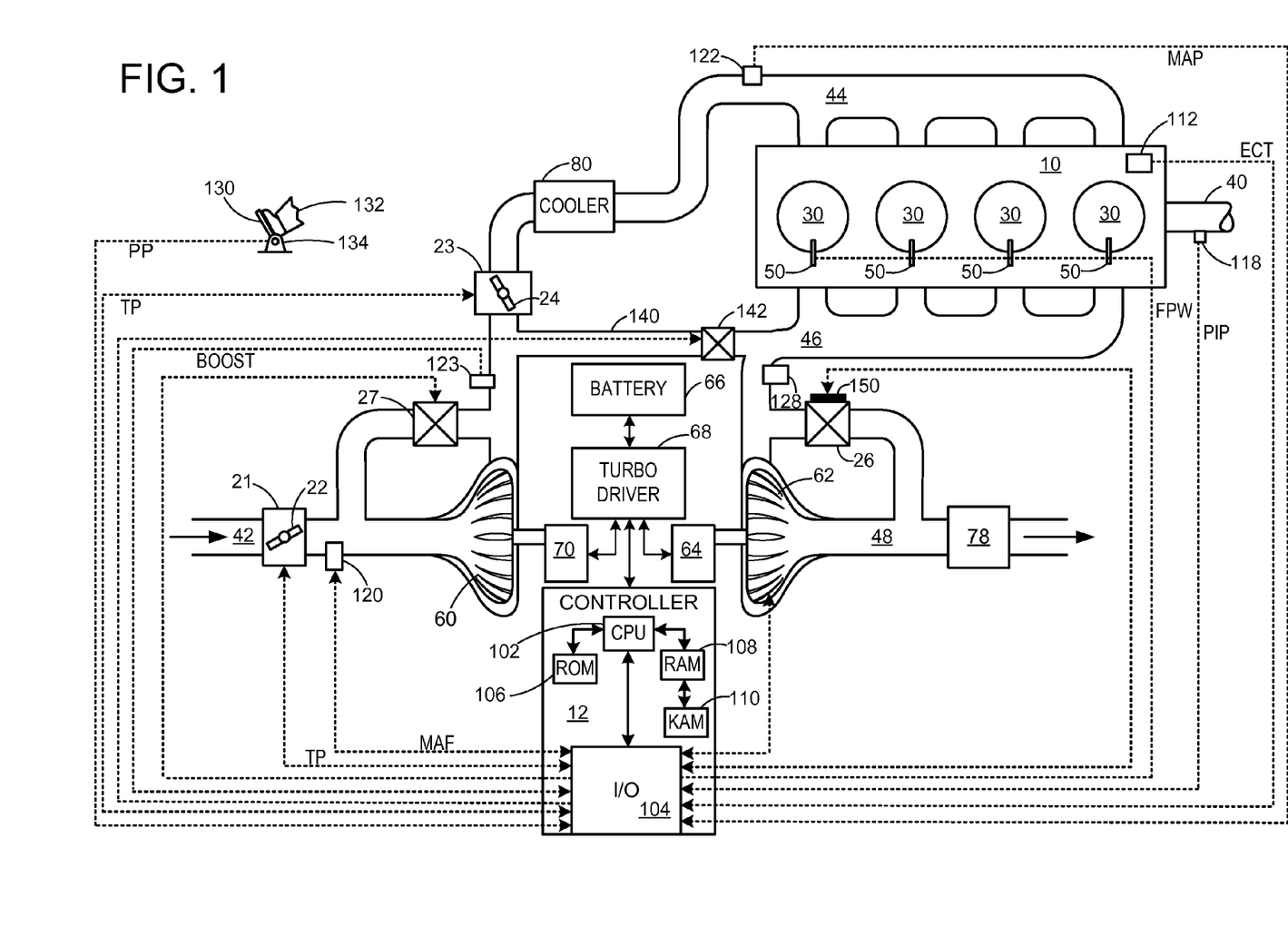
FIG. 1 shows a block diagram of a turbocharged engine including a wastegate.
Figure 2:
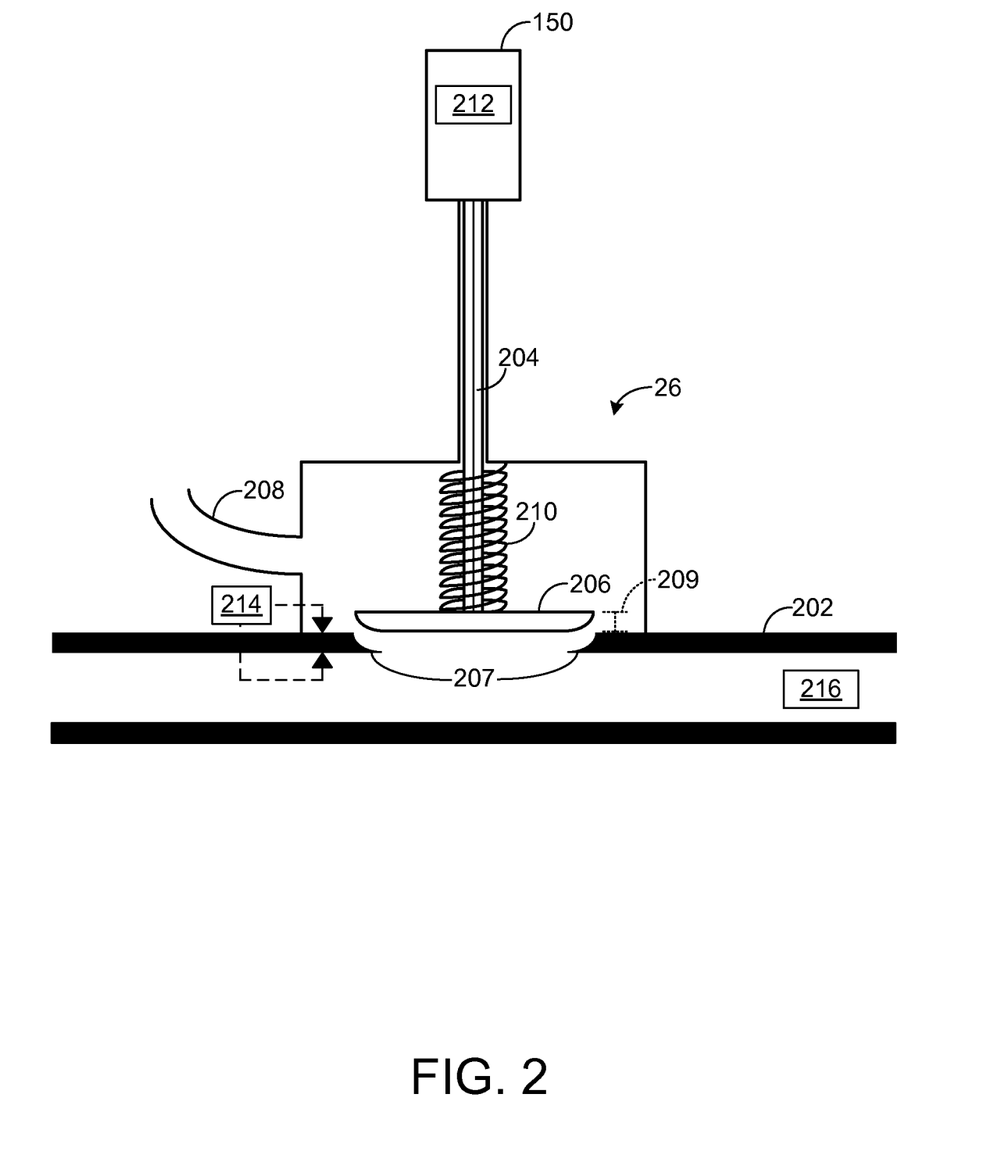
FIG. 2 shows an exemplary wastegate in accordance with an embodiment of the present disclosure.
Figure 3:
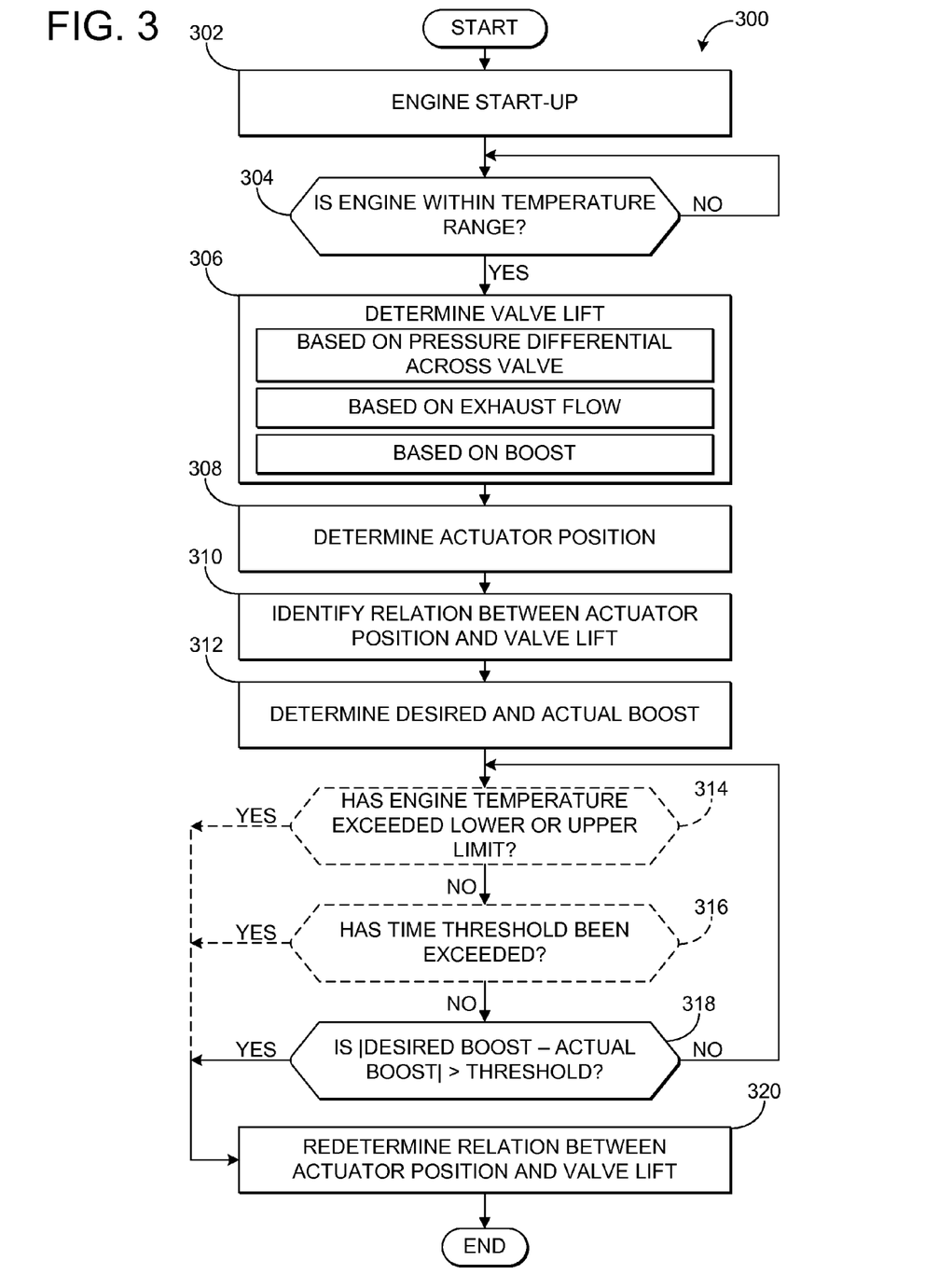
FIG. 3 shows a flow chart illustrating a method for determining the lift of a wastegate valve.
Figure 4:
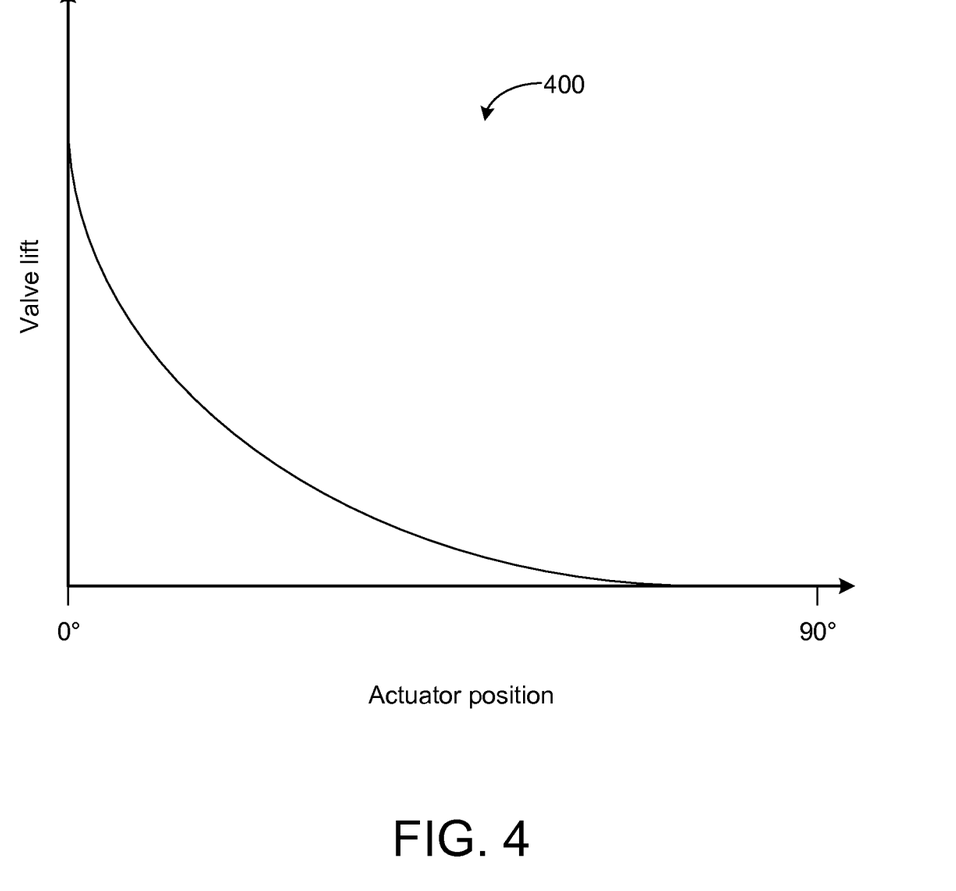
FIG. 4 shows an exemplary graph of a transfer function in accordance with an embodiment of the present disclosure.

Various systems and methods for determining the lift of a wastegate valve are provided. For example, a method comprises determining a relation between an actuator position and a lift of a wastegate valve at engine start-up in a temperature range. The relation may be modified based on a difference between a desired boost level and an actual boost level. FIG. 1 is a block diagram of a turbocharged engine including a wastegate. FIG. 2 shows an exemplary wastegate in accordance with an embodiment of the present disclosure. FIG. 3 shows a flow chart illustrating a method for determining the lift of a wastegate valve. FIG. 4 shows an exemplary graph of a transfer function in accordance with an embodiment of the present disclosure.

FIG. 1 is a schematic diagram showing an example engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttles 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102 (e.g., a logic subsystem), input/output ports 104, an electronic storage medium or subsystem for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator. In some embodiments, actuator 150 may be an electric motor. Additional detail regarding wastegate 26 and actuator 150 will be presented below. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example. Additional details of an example wastegate that may be used in the system of FIG. 1 are shown in FIG. 2.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, wastegate 26 and actuator 150, both of engine 10, are shown in greater detail. Wastegate 26 is included along a portion of an exhaust manifold 202, which may be exhaust manifold 46 shown in FIG. 1, for example. Actuator 150 is mechanically coupled via a mechanical linkage 204 to a wastegate valve 206. In this example, actuator 150 is an electric actuator and in particular an electric motor configured to adjust the vertical position of linkage 204 and thus valve 206 based on received currents. Other arrangements are possible, however, in which other types of actuators and linkages are provided in wastegate 26. Actuator 150 thus transmits a driving force to valve 206, which may transition between a fully closed position and a fully open position, and may settle at any position therebetween. In the illustrated example, valve 206 is in at least a partially open position, being positioned vertically above and separated from a valve seat 207. The vertical distance between a corresponding point on valve 206 and valve seat 207 is referred to herein and designated as a lift 209. It is the determination of lift 209 which is in part sought in the course of adjusting the boost level supplied to engine 10. In the presence of high temperatures, however, the length of linkage 204 will vary due to material deformation (e.g., elongation). Although a commanded position issued to actuator 150 may result in an appropriate lift 209 for a desired level of boost at normal temperatures (e.g., at engine start-up in the presence of ambient temperatures around 25° C.), a commanded actuator position may result in an inappropriate lift for a desired boost level at a later time in which temperatures in wastegate 26 have increased (e.g., at around 850° C.), due to material deformation in linkage 204. Because actuator 150 and its corresponding position sensor are disposed a distance away from valve 206 to avoid high temperatures and consequent degraded operation, the actual lift 209 of valve 206 is unavailable. A method 300 is described in further detail below with reference to FIG. 3, which may be executed to determine wastegate valve lift even in the presence of linkage deformation due to high temperatures.

Wastegate 26 also includes a vent 208 which may receive and exhaust gas from exhaust manifold 202 when wastegate valve 206 is not in the fully closed position. Thus, the amount of boost supplied to an engine may be controlled by driving wastegate valve 206 via actuator 150, thereby altering the position of wastegate valve 206 and the amount of gas reaching an intake manifold. In one example, the valve 206 may be formed via a pintle, with a surface area facing the flow through manifold 202. The pressure difference across the pintle may generate forces acting to move the pintle.

Actuator 150 may include a motor and a gear box (not shown), and may further include an actuator position sensor 212. In one example, sensor 212 may measure the linear displacement of linkage 204. Alternatively, in embodiments in which actuator 150 includes a motor, sensor 212 may be a rotary encoder housed therein. In this case, sensor 212 may be coupled to the slowest rotating element in the motor which is coupled to linkage 204, and may collect measurements across the entire range through which the element rotates, which may be for example 180°. Here, the output of the encoder varies as the motor rotates. In another example, the motor includes a screw (e.g., a ball screw), whose rotation may be measured by sensor 212 and used to determine the position of the motor. However, a different positional encoder may be used, as the ball screw or other rotating element may rotate through a range greater than 180 and/or 360 degrees. Various suitable encoders may be used which, for example, detect changes in angular position as opposed to absolute position. Regardless, sensor 212 outputs signals which are in some way representative of the position of linkage 204. It will be noted that various suitable wastegate arrangements may be used without departing from scope of the present disclosure, and may, for example, depend on mechanical design and packaging constraints.

Wastegate 26 also includes a differential pressure sensor 214 configured to sense pressures at both sides of wastegate valve 206—e.g., inside exhaust manifold 202 and opposite the manifold in the region in fluidic communication with vent 208. An exhaust flow sensor 216 may also be included in wastegate 26, positioned particularly within exhaust manifold 202. Sensor 216 may be configured to determine the flow rate of exhaust gas flowing through manifold 202. Sensors 214 and 216 may facilitate the determination of lift 209 of valve 206, as described in further detail below with reference to FIG. 3. It will be appreciated, however, that one or more of the sensors described herein may be soft sensors based on pre-calibrated models.

Wastegate 26 may further include a bias 210. Bias 210 is attached at one end to wastegate 26 and to wastegate valve 206 at the other end. In some embodiments, bias 210 is selected to supply a closing force which maintains wastegate valve 206 in a fully closed position up to a threshold pressure. As one non-limiting example, bias 210 may be selected to allow wastegate valve 206 to open for a mean pressure difference across the turbocharger turbine between 0.75 bar and 1 bar. In the event of wastegate degradation, for example due to a loss of power to actuator 150, wastegate valve 206 may be maintained in a fully closed position up to a threshold pressure via a spring pre-load provided by bias 210, ensuring that a sufficient buildup of boost is delivered to the engine. Conversely, at or above the threshold pressure, bias 210 may allow wastegate valve 206 to move toward a fully open position, limiting maximum boost, especially at high loads. Moreover, the size of a wastegate actuator (e.g., actuator 150) and its power consumption may be reduced, as bias 210 supplies additional closing force to wastegate 26. Therefore, during non-degraded operation, the actuator may hold the valve in the fully closed position with a current level that is lower than if the spring pre-load was zero. Current supplied to a wastegate actuator may thus be selected to account for the closing force of bias 210. In the illustrated embodiment, bias 210 is shown as a spring in a precompressed state, though various suitable structures may be used to supply additional closing force to wastegate valve 206. In the case where a spring is employed, the spring constant may be selected to supply closing force up to a particular threshold pressure and supply sufficient boost to an engine.

Wastegate 26 may provide additional advantages. Pneumatic wastegates, in some examples, supply closing force to a wastegate valve by creating a pressure differential across a diaphragm which is attached to a spring. Such pneumatic wastegates are therefore limited in their supply of force to the pressure differential and the spring force. In a normal operating condition, wastegate 26 may instead supply higher levels of closing force via bias 210 and its associated electric actuator (e.g., actuator 150). As such, even while maintaining the wastegate fully closed, the actuator current may be adjusted responsive to engine operating conditions (e.g., increased for increasing exhaust manifold pressure, and vice versa) in order to maintain the fully closed position in combination with the spring pre-load force, the spring pre-load force being non-zero.

Turning now to FIG. 3, a method 300 is shown for determining the lift of a wastegate valve. Method 300 may be used to determine lift 209 of wastegate valve 206 of wastegate 26 in engine 10 even in the presence of high temperatures. Method 300 may be stored on a storage subsystem and executed by a logic subsystem of an engine controller such as controller 12 of FIG. 1, for example.

At 302 of method 300, engine 10 is started-up, prompted for example by a key ignition event caused by a vehicle operator. Engine 10 operates as described above with reference to FIG. 1. At 304, it is determined whether engine 10 is within a temperature range. The temperature range may be predetermined, extending between 0° C. and 40° C., for example, and in some embodiments may be below a warmed up engine operating temperature (e.g., 0° C.) while including a temperature range corresponding to cold start of the engine. The temperature range is selected such that method 300 is executed when engine operating conditions facilitate sufficient determination of wastegate valve lift; if engine temperature exceeds a lower or upper limit (e.g., is outside of the temperature range), material deformation (e.g., contraction, expansion, etc.) in wastegate valve-actuator linkage 204 may cause inaccurate and/or insufficient determination of valve lift, resulting in improper supply of boost to engine 10. The temperature of engine 10 may be determined by various suitable methods including utilizing engine coolant temperature measurements from temperature sensor 112. If the temperature of engine 10 is not within the temperature range (NO), method 300 returns to 304. If the temperature of engine 10 is within the temperature range (YES), method 300 proceeds to 306.

At 306, the lift 209 of wastegate valve 206 is determined. Valve lift 209 may be determined based on one or more signals provided by various sensors in engine 10. Such signals include the pressure differential across valve 206, which may be made available by differential pressure sensor 214, exhaust flow through exhaust manifold 202, which may be made available by exhaust flow sensor 216, and the level of boost provided to engine 10, which may be made available by sensor 123 as described above with reference to FIG. 1. As described above, however, one or more of the sensors described herein may be soft sensors based on predetermined models.

At 308, the position of actuator 150 of wastegate 26 is determined. As described above, the type of measurements made to determine the position of actuator 150 will depend on the type of actuator used and the components housed therein. For example, sensor 212 may be used to measure the linear (e.g., vertical) displacement of linkage 204. Alternatively, sensor 212 may be a rotary encoder housed in a motor and configured to sense the rotation throughout an angular range of the slowest rotating element in the motor. Still further, sensor 212 may sense the rotation of a screw (e.g., ball screw) in the motor to determine the position of the motor. Regardless, the output of sensor 212 may be used to determine the position of actuator 150.

At 310, a relation between the determined position of actuator 150 and the determined lift 209 of valve 206 is identified. The relation may be selected from various suitable relations which may be formed by controller 12, including a transfer function, lookup table, or other relation. The relation may be saved following identification in a computer readable storage medium such as RAM 108 in FIG. 1. FIG. 4 shows a graph 400 of an exemplary transfer function, which plots lift of a wastegate valve on a y-axis against the position of an actuator on an x-axis. Graph 400 is provided merely for the sake of illustration, and is not intended to be representative of an actual graph of such a transfer function computed during the course of engine operation. Nevertheless, graph 400 may represent a non-linear relation between valve lift and actuator position in the presence of relatively high operating temperatures (e.g., extending to 900° C.). Graph 400 may be utilized by controller 12 such that supply of an actuator position as input may output a corresponding valve lift, which may be used to provide a desired boost level to engine 10. It will be noted that in this example lift decreases as a wastegate valve is brought closer to its valve seat; in the example of FIG. 2, lift 209 of valve 206 decreases as the valve is brought closer to valve seat 207.

At 312, a desired boost level and an actual boost level being supplied to engine 10 are determined. The desired boost level may be determined according to the operating conditions of engine 10, which may be assessed directly with measurements from various sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST from sensor 123), engine speed, idle speed, barometric pressure, a driver-demanded torque (for example, from a pedal position sensor 134), air temperature, vehicle speed, etc. The actual boost level being supplied to engine 10 may be directly measured from a sensor, such as sensor 123. The measurement may be sent to controller 12 via the BOOST signal and stored in a computer readable storage medium. In an alternative embodiment, the actual boost may be estimated based on other operating parameters, such as based on MAP and RPM, for example. It will be appreciated that in some embodiments the boost level determined at 306 may be used as the actual boost level.

At 314, it is optionally determined whether the temperature of engine 10 has exceeded a lower or upper limit. The temperature of engine 10 may be determined based on output provided by various sensors, including but not limited to measurements of engine coolant temperature provided by temperature sensor 112 of FIG. 1. The temperature evaluated herein may further be the temperature of the skin of turbine 62 of FIG. 1. As a non-limiting example, the lower limit may be the ambient temperature at start-up, while the upper limit may be 900° C. The lower and upper limits may be predetermined and based on known deformation rates of the types of materials used in wastegate 26 of FIG. 2 and particularly linkage 204. If it is determined that the engine temperature does not exceed the lower or upper limit (NO), method 300 proceeds to 316. If it is determined that the engine temperature does exceed the lower or upper limit (YES), method 300 proceeds to 320 where the relation determined at 310 is redetermined. Thus, the lower and upper limits may be selected such that they correspond to operating regions (e.g., temperatures) whereat material deformation in linkage 204 becomes significant enough to merit redetermination of the relation between valve lift and actuator position.

At 316, it is optionally determined whether a time threshold has been exceeded. The time threshold may correspond to a duration during which engine 10 has been operating and is likely, at the culmination of the duration, at an operating temperature causing material deformation in linkage 204 of FIG. 2 meriting redetermination of the relation between valve lift and actuator position, as described above. In some embodiments, method 300 may bypass the determination at 314 and instead perform the determination at 316, which may be applicable to scenarios in which accurate and/or sufficient temperature readings of engine 10 are unavailable. If it is determined that the time threshold has not been exceeded (NO), method 300 proceeds to 318. If it is determined that the time threshold has been exceeded (YES), method 300 proceeds to 320.

At 318, method 300 determines whether the absolute value of the difference between the desired boost level and the actual boost level supplied to engine 10 exceeds a threshold. If it is determined that the absolute value of this difference does not exceed the threshold (NO), method 300 returns to 314. If it is determined that the absolute value of this difference does exceed the threshold (YES), method 300 proceeds to 320 where the relation between the actuator position and valve lift is redetermined. Here, it is recognized that a significant difference exists between the desired boost level and the actual boost level supplied to engine 10. To continue to provide sufficient boost, method 300 proceeds to 320 where the relation between the position of actuator 150 and lift 209 of wastegate valve 206 is redetermined. This relation may be redetermined as described above with reference to steps 306, 308, and 310, and may produce a modified version of graph 400 of FIG. 4 and its corresponding transfer function, in some embodiments. In this way, the relation between actuator position and valve lift may be tracked and modified over the course of engine operation after engine start-up, responsive to material deformation (e.g., expansion, contraction) in linkage 204 coupling actuator 150 to wastegate valve 206 of FIG. 2 due to high temperatures. In some embodiments, the relation between actuator position and valve lift may only be modified if the engine temperature is above the temperature range evaluated at 304. Further, in other embodiments the identification of the relation may be restarted as an idle stop operation occurs. An adaptive scheme may be implemented for the relation between actuator position and valve lift at different temperatures.

The relation between wastegate valve lift and actuator position identified via method 300 may be used by another routine used to control actuator position and thus valve lift. Specifically, the relation may yield a decreased lift of a wastegate valve (e.g., lift 209 of valve 206) for a given actuator position toward an upper end of the temperature range evaluated at 304, the decreased lift being less than the lift otherwise occurring without employment of method 300. Likewise, the relation may yield an increased valve lift for a given actuator position toward a lower end of the temperature range, the increased lift being greater than the lift otherwise occurring without employment of method 300. FIG. 4 illustrates such a possibility; graph 400 of an exemplary transfer function between valve lift and actuator position may represent such a transfer function identified at a temperature toward the upper end of the temperature range evaluated at 304 of method 300. Here, a given actuator position supplied as input to the transfer function may yield a decreased valve lift as output compared to the valve lift yielded at a temperature corresponding to a cold start of an engine. The transfer function may be generated using a series of data points, with interpolation therebetween.

The relation, along with other elements determined as a part of method 300, may be used as part of a boost control routine in which a wastegate is adjusted to open in response to the actual boost being supplied to an engine (e.g., engine 10 of FIG. 1) being detected as exceeding the desired boost. The boost control routine may further include closing the wastegate in response to the actual boost being supplied to the engine being detected as being less than the desired boost.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling boost of a turbocharged internal combustion engine having a wastegate valve, comprising:
   via a controller including a non-transitory computer-readable medium, and based on sensors sensing an engine temperature, an actuator position, and boost identifying a relation between an actuator position and a lift of a wastegate valve at engine start-up in an engine temperature range; and
   after start-up, modifying the relation between the actuator position and the lift of a wastegate valve based on a difference between a desired boost level and an actual sensed boost level via adjusting at least one of the actuator position and the lift of a wastegate valve.

2. The method of claim 1, wherein the modifying occurs only at an engine temperature higher than the engine temperature range.

3. The method of claim 2, wherein the relation is a transfer function between wastegate valve lift and actuator position.

4. The method of claim 1, wherein the engine temperature range is below a warmed-up engine operating temperature, and wherein the engine temperature range includes engine cold start.

5. The method of claim 1, wherein the relation is not learned when outside the engine temperature range at restart from an idle stop operation.

6. The method of claim 5, wherein the lift of the wastegate valve is further identified based on the actual sensed boost level, the method further comprising adjusting the wastegate valve to open further in response to actual boost greater than desired, and close further in response to actual boost less than desired after an engine starting operation.

7. The method of claim 1, wherein the relation yields a decreased lift of the wastegate valve for a given actuator position at an upper end of the engine temperature range and yields an increased lift of the wastegate valve for a given actuator position at a lower end of the engine temperature range.

8. The method of claim 1, wherein the engine temperature range extends between 0° C. and 40° C.

9. The method of claim 1, wherein the lift of the wastegate valve is identified based on a pressure differential and exhaust flow, the pressure differential based on the boost sensor.

10. The method of claim 1, wherein the relation is modified upon exceeding a time threshold, the relation modified such that a decreased lift of the wastegate valve is yielded for a given actuator position.

11. The method of claim 1, wherein the relation is modified upon exceeding an engine temperature threshold, the relation modified such that a decreased lift of the wastegate valve is yielded for a given actuator position.

12. The method of claim 1, wherein the relation is modified if the difference exceeds a threshold, the relation modified such that the relation yields a decreased lift of the wastegate valve for a given actuator position at an upper end of the engine temperature range and yields an increased lift of the wastegate valve for a given actuator position at a lower end of the engine temperature range.

13. An internal combustion engine, comprising:
at least one cylinder;
a compression device including a compressor arranged along an intake manifold and a turbine arranged along an exhaust passage;
a wastegate arranged along the exhaust passage, the wastegate including a wastegate valve coupled to an actuator via a linkage;
sensors sensing an engine temperature, boost, and an actuator position, and
an engine controller including a non-transitory computer-readable medium including a logic subsystem and a storage subsystem holding instructions thereon executable by the logic subsystem to:
determine a relation between a position of the actuator and a lift of the wastegate valve at start-up of the engine in an engine temperature range; and
modify the relation between the position of the actuator and the lift of the wastegate valve based on a difference between a desired boost level and an actual boost level via adjusting at least one of the actuator position and the lift of a wastegate valve.

14. The engine of claim 13, wherein the relation is a transfer function between wastegate valve lift and actuator position.

15. The engine of claim 13, wherein the engine temperature range extends between 0° C. and 40° C.

16. The engine of claim 13, wherein the lift of the wastegate valve is determined based on a pressure differential and exhaust flow, the pressure differential based on the boost sensor.

17. The engine of claim 16, wherein the lift of the wastegate valve is further determined based on the actual boost level.

18. The engine of claim 13, wherein the relation is modified upon exceeding a time threshold.

19. The engine of claim 13, wherein the relation is modified upon exceeding an engine temperature threshold or if the difference exceeds a threshold.

20. A method of controlling boost of a turbocharged internal combustion engine having a wastegate valve, comprising:
via a controller including a non-transitory computer-readable medium, and based on sensors sensing an engine temperature, an actuator position, and boost identifying a relation between an actuator position and a lift of a wastegate valve at engine start-up in an engine temperature range; and
after start-up, via the controller, modifying the relation between the position of the actuator and the lift of the wastegate valve based on a difference between a desired boost level and an actual boost level;
wherein the relation yields a decreased lift of the wastegate valve for a given actuator position at an upper end of the engine temperature range and yields an increased lift of the wastegate valve for a given actuator position at a lower end of the engine temperature range.

* * * * *